Figure 1:
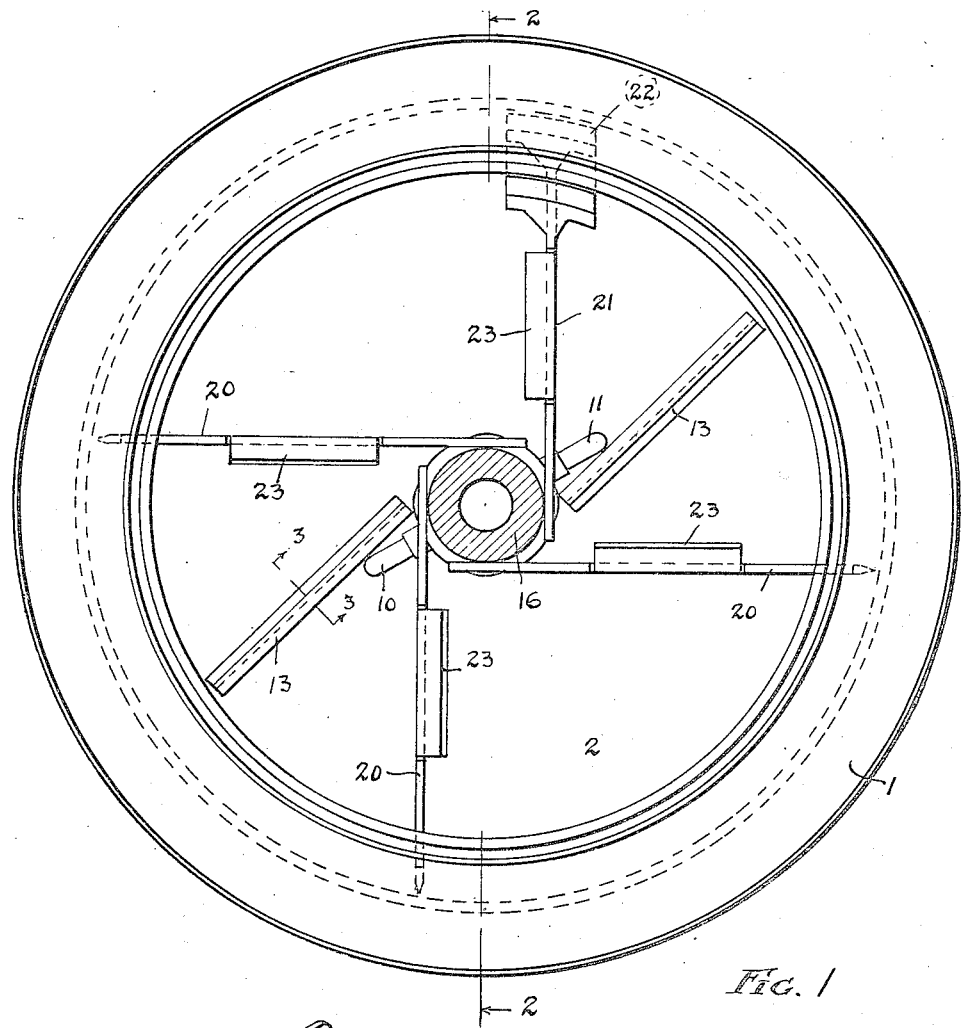

March 3, 1936.                    W. M. ZORN ET AL                    2,032,785
              METHOD OF AND APPARATUS FOR DISASSOCIATING
                 THE COMPONENTS OF SOLUTIONS AND MIXTURES
                    Filed June 20, 1932          2 Sheets-Sheet 1

INVENTORS
Walter M Zorn &
BY Theodore H. Eickhoff
Fay, Oberlin & Fay
ATTORNEYS.

March 3, 1936.  W. M. ZORN ET AL  2,032,785
METHOD OF AND APPARATUS FOR DISASSOCIATING
THE COMPONENTS OF SOLUTIONS AND MIXTURES
Filed June 20, 1932   2 Sheets-Sheet 2

INVENTORS
Walter M. Zorn &
BY Theodore H. Eickhoff.
Fay, Oberlin & Fay
ATTORNEYS.

Patented Mar. 3, 1936

2,032,785

UNITED STATES PATENT OFFICE 2,032,785

METHOD OF AND APPARATUS FOR DISASSOCIATING THE COMPONENTS OF SOLUTIONS AND MIXTURES

Walter M. Zorn and Theodore H. Eickhoff, East Cleveland, Ohio, assignors, by direct and mesne assignments, to The Low Temperature Processing Company, a corporation of Ohio Application June 20, 1932, Serial No. 618,224

6 Claims. (Cl. 159—6)

This invention relating as indicated to method of and apparatus for disassociating the components of solutions and mixtures has specific reference to methods of and apparatus for converting directly into a dry state solutions or mixtures containing certain percentages of solvents.

While the principles comprising our invention are, in general, applicable to the broad field of disassociating the components of solutions and mixtures, nevertheless, the same has been developed for the primary purpose of producing solid concentrates of foods and beverages such as milk, coffee, tea, fruit juices and the like.

Two general processes for the concentration of liquids have been suggested and employed with varying degrees of success. The first and most widely employed process of concentration is that employing heat for the purpose of driving off at least some or all the solvent so that the concentrate may be in either liquid or solid form. This process employing heat has never met with full success when employed in the processing of certain foods and beverages for the reason that the heat employed in such process imparts to the material being treated an undesirable cooked flavor.

The other process which has been employed for purposes of concentration of foods and beverages is that known as the ice crystallization process in which material to be concentrated is frozen at least partially to convert the solvent into ice crystals which are then separated from the residue concentrate but this process is incapable of producing a solid dehydrating concentrate. It is among the objects of this invention to provide a method of and apparatus for disassociating the components of solutions and physical mixtures, without the employment of heat, so that the various foods and beverages, such as those above enumerated, may be reduced to a dry and/or powdered state without the presence of the undesirable cooked taste which has heretofore prevented such powdered products from meeting with any appreciable success.

Other objects of my invention appear as the description proceeds.

To the accomplishment of the foregoing and related ends, said invention, then consists of the means hereinafter fully described and particularly pointed out in the claims.

The annexed drawings and the following description set forth in detail certain means and one mode of carrying out the invention, such disclosed means and mode illustrating, however, but one of various ways in which the principle of the invention may be used.

The process comprising my invention, for the disassociation of the components of solutions or physical mixtures, comprises the steps of centrifugally spreading a layer of the material over a moving surface and simultaneously agitating such a layer of material and subjecting the same to the action of a solvent-absorbing gaseous medium for the purpose of carrying away the solvent; and by conveying the material, being treated, over such moving surface and through different zones of treatment, it is possible to directly produce a dry or substantially dry concentrate of the original material, such as an infusion. The apparatus comprising our invention for carrying out the above defined process may best be understood by having reference to the annexed drawings.

Figure 4:
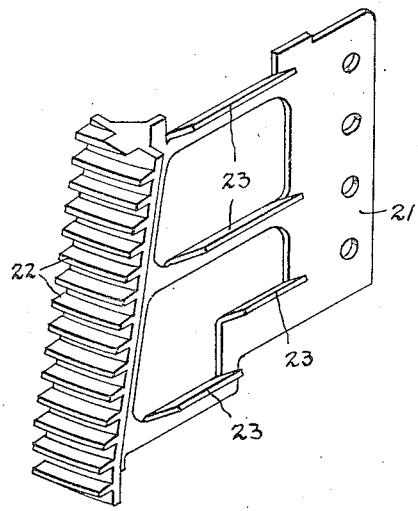
Figure 3:
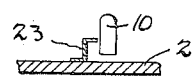
Figure 2:
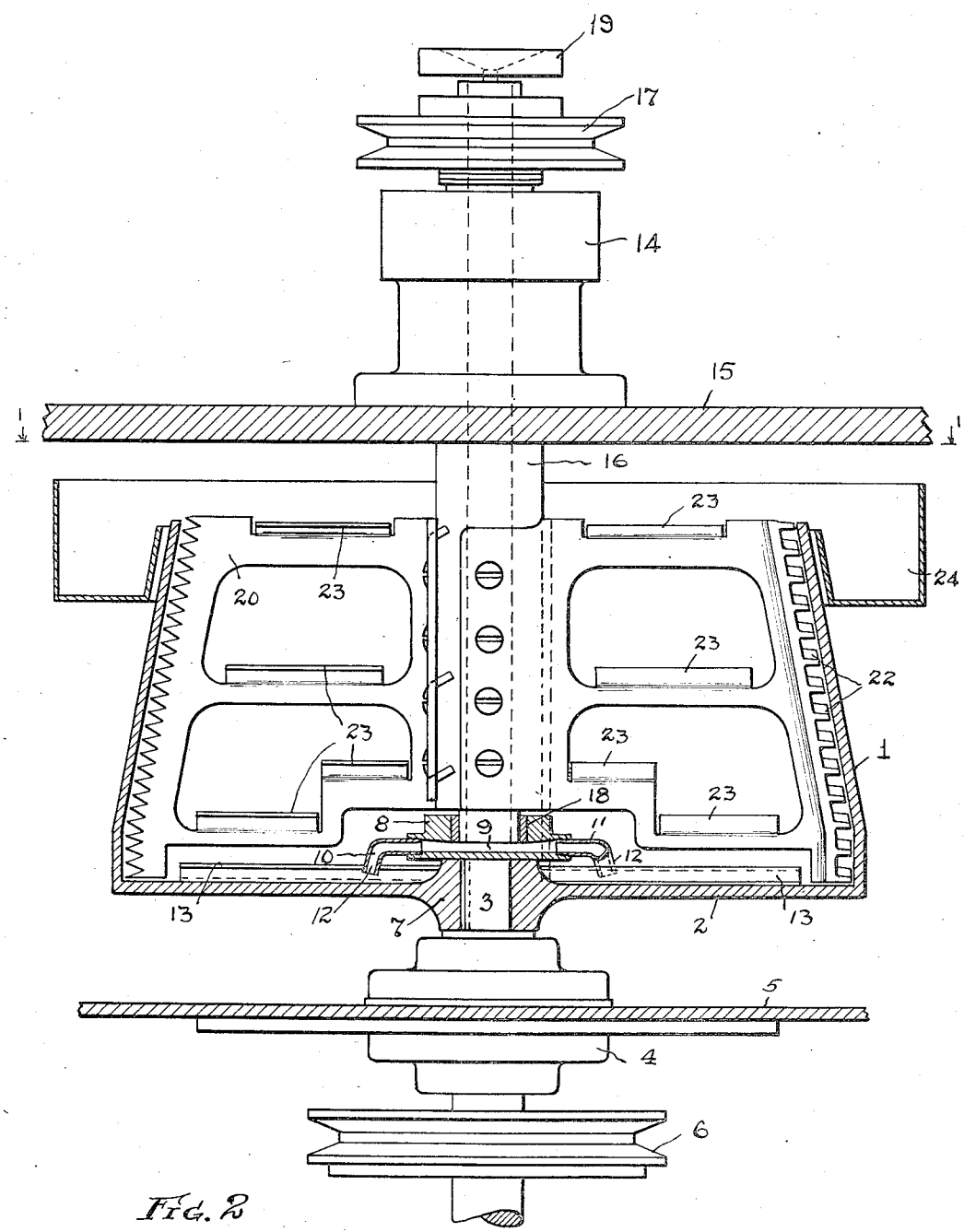

In said annexed drawings:

Fig. 1 is a plane view of the major portion of the apparatus comprising my invention; Fig. 2 is a transverse sectional view of the apparatus illustrated in Figure 1 taken on a plane substantially indicated by the line 2—2; Fig. 3 is a fragmentary sectional view of a portion of the apparatus illustrated in Figure 1 taken on a plane substantially indicated by the line 3—3; and Fig. 4 is a perspective view of the conveying vane or blade forming one element of the combination illustrated in Figures 1 and 2.

Referring now more specifically to the drawings and more especially to Figure 1, the apparatus herein illustrated and capable of carrying forth the above defined principles of my invention comprises a substantially coniform centrifugal bowl 1 which has a closed bottom 2 and is keyed to a rotatable shaft 3. The shaft 3 is journaled in a suitable bearing 4 carried by a frame 5 and the shaft is driven at a suitable speed and in the desired direction by some means such as a belt trained about a sheave 6 likewise keyed to the shaft 3. The hub 7 of the bottom 2 of the bowl has secured thereto a material distributing member, generally indicated at 8, which has a recessed central portion 9 from which fluid ducts 10 and 11 extend radially. The terminal portions 12 of the fluid ducts 10 and 11 extend in a generally axial direction with respect to the bowl 1 and terminate in front of deflector members 13, likewise secured to and rotatable with the bottom 2 of the bowl. The deflector members 13 have been illustrated as formed of Z-shaped bars with one flange of the Z secured to the bottom 2 of the bowl and the other flange overlying such bottom to form a channel through which the liquid discharged from the terminals 12 of the fluid conduits 10 and 11 is thrown outwardly under centrifugal force upon rotation of the bowl 1 so that such liquid is brought up to substantially the peripheral speed of the bowl before being discharged into the layer of the solution impounded on the inner periphery of the bowl.

In axial alignment with and supported on a suitable bearing 14 and bracket member 15 is a shaft 16 which likewise is driven by some suitable means such as a belt trained about a sheave 17. The shaft 16 carries a plurality of radially extending vanes or blades which severally act upon the material being treated in the manner hereinafter more fully explained.

The lower end of the shaft 16 is journaled in a bearing 18 carried by the hub 7 of the bowl 1. The shaft 16 is provided with an axially extending bore through which the material is conducted from a receiving funnel 19 to the cavity within the bore 7 with which the fluid conduits 10 and 11 are in communication so that when material is poured into the funnel 19 it will ultimately be thrown against the inner periphery of the bowl 1 and at substantially the surface speed of such bowl.

The shaft 16 has, as most clearly illustrated in Figures 1 and 2, three radially extending vanes 20 secured thereto such as by a plurality of screws and passing through such vanes and in threaded engagement with the shaft 16 which, in this area, may be polygonal in form to provide substantial bearing faces against which these vanes 20 may be secured. The outer edges of the vanes 20 are serrated, as most clearly illustrated in Figure 2 and terminate within only a short distance from the inner periphery of the bowl 1, so that when the bowl and vanes are relatively rotated, the vanes will effect an agitation of the material which is impounded on the inner periphery of the bowl.

At this point, it may be well to note that the bowl 1 and the shaft 16 and its associated vanes will both be driven preferably in the same direction and at a relatively high speed, sufficiently high so that the liquid being treated is impounded by centrifugal force on the inner periphery of the bowl 1. While the shaft 16 is rotated in the same direction as the bowl 1, nevertheless the two elements will be rotated at slightly different speeds to produce relative movement between the vanes carried by the shaft 16 and the bowl 1, i. e., the material impounded on the inner periphery of the bowl. In addition to the three agitating vanes carried by the shaft 16 such shaft also carries a radially extending vane, generally indicated at 21 which, at its outer periphery, as most clearly illustrated in Figure 4, is provided with a plurality of vertically spaced curved conveyor blades 22 which likewise extend as most clearly illustrated in Figure 2 into close proximity to the inner periphery of the bowl 1.

The vanes 20 and 21 are preferably skeletonized as most clearly illustrated in Figures 2 and 4 and the radially extending supporting webs are provided with fan blades 23 which, when the shaft 16 and accordingly the vanes carried thereby, are rotated at a high speed, such fans will project at a high velocity a stream of gaseous medium, such as air, against the bottom 2 of the bowl from which such stream will be deflected and caused to pass outwardly in annular form and at a high velocity over the agitated inner surface of the material impounded on the inner surface of the bowl 1.

During the operation of the above described apparatus and during the carrying forth of the principles comprising my invention the solution or physical mixture, the components of which are to be disassociated, is fed to the apparatus through the funnel 19 from which it will pass downwardly through the shaft 16 and outwardly from the conduits 10 and 11 and ultimately be carried by the baffles 13 into contact with the inner periphery of the bowl 1 and projected against the bowl at substantially the same surface speed as the bowl. The apparatus will be operated with a continued supply of material sufficient to cause the liquid to be impounded for a portion of the way up the wall of the coniform centrifugal bowl. As the bowl and the impounded layer of solution or mixture is rotated, the movement of the vanes 20 and 21 relatively to such bowl will cause not only an agitation of this impounded liquid so as to subject a greater surface area thereof to the action of the solvent absorbing gaseous medium but the vane 21 will continuously urge the material upwardly along the sloping wall of the bowl. The material will be urged upwardly into the constricted area of the bowl and spread out as a thin layer thereover to not only increase the rate of removal of the solvent but also to permit the blast of gaseous medium, as it moves over the surface of the wall, to pick up whatever particles have become dry and carry the same outwardly over the edge of the bowl to be discharged ultimately into a collecting trough, generally indicated at 24. The tests which have been conducted on the above illustrated apparatus in order to prove the operability thereof and the feasibility of the method comprising my invention have shown that the use of air in the vicinity of room temperature is very satisfactory for the efficient operation of the apparatus and the carrying forth of the method. It is the tremendous interchange of air and subjecting a relatively large surface area of the liquid or solution to the action of the air which enables the disassociation of the components of the solution to proceed to the point where the material discharged is completely dried.

For the concentration of certain foods such as beverages and the like, it will be found that the operation of reducing the solid components of the solution to a dry state may be carried on most efficiently in the apparatus above defined if such beverage or infusion is first subjected to a partial concentration by the ice crystallization process. When the ice crystallization process is employed to initially partially concentrate the infusion such as coffee, tea or fruit juices, the complete concentration from a liquid to a dry state may be carried on by the method and apparatus comprising this invention without subjecting the material to heat sufficient to produce the undesirable cooked taste.

Other modes of applying the principle of our invention may be employed instead of the one explained, change being made as regards the means and the steps herein disclosed, provided those stated by any of the following claims or their equivalent be employed.

We therefore particularly point out and distinctly claim as our invention:

1. In apparatus for disassociating the components of a solution, the combination of a rotatable centrifugal bowl, means for introducing a layer of the solution to the inner periphery of such bowl, means for agitating such layer, means for conveying such layer along the inner surface of said bowl, and means for projecting a gaseous medium over the surface of such layer.

2. In apparatus for disassociating the components of a solution, the combination of a coniform centrifugal bowl, means for introducing a layer of the solution to the inner periphery of such bowl, means for agitating such layer, means for conveying such layer along the inner surface of said bowl, and means for projecting a gaseous medium over the surface of such layer.

3. In apparatus for disassociating the components of a solution, the combination of a coniform rotatable centrifugal bowl, means for introducing a layer of the solution to the inner periphery of the bowl at its wider part, means for conveying such layer along the inner periphery of said bowl into a narrower part, and means for projecting a gaseous medium over the surface of said layer.

4. In apparatus for disassociating the components of a solution, the combination of a coniform rotatable centrifugal bowl, means for introducing a layer of the solution to the inner periphery of the bowl at its wider part, means for conveying such layer along the inner periphery of said bowl into a narrower part, means for agitating such layer, and means for projecting a gaseous medium over the surface of said layer.

5. The process of separating the components of a physical mixture which comprises the steps of centrifugally spreading the solution in a vertical cylindrical layer against a portion of a moving surface, lifting said solution over upper portions of said surface and simultaneously subjecting said solution to a blast of gaseous medium adapted to absorb and carry away the solvent.

6. The process of separating the components of a solution and the like which comprises introducing such material to be treated to the inner periphery of an axially tapered bowl, rotating such bowl to cause said material to flow by centrifugal force toward the area of said bowl having the larger diameter, at the same time mechanically conveying at least a portion of such material in a direction opposite to that in which it would thus flow under centrifugal force, and at the same time subjecting the material to a treating fluid.

WALTER M. ZORN.
THEODORE H. EICKHOFF.